United States Patent [19]

Tanabe

[11] Patent Number: 4,795,231
[45] Date of Patent: Jan. 3, 1989

[54] OPTICAL FIBER CONNECTOR

[75] Inventor: Takashi Tanabe, Tokyo, Japan

[73] Assignee: NEC Corporation, Tokyo, Japan

[21] Appl. No.: 145,995

[22] Filed: Jan. 20, 1988

[30] Foreign Application Priority Data

Jan. 20, 1987 [JP] Japan .................................. 62-9091

[51] Int. Cl.⁴ .............................................. G02B 6/38
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 4,105,285 | 8/1978 | Bedgood et al. | 350/96.21 |
| 4,236,787 | 12/1980 | Iacono et al. | 350/96.21 |
| 4,614,402 | 9/1986 | Caron et al. | 350/96.21 |
| 4,666,241 | 5/1987 | Caron | 350/96.21 |
| 4,697,871 | 10/1987 | Cook | 350/96.21 |
| 4,735,482 | 4/1988 | Yoshida et al. | 350/96.20 |

*Primary Examiner*—William L. Sikes
*Assistant Examiner*—Frank González
*Attorney, Agent, or Firm*—Sughrue, Mion, Zinn, Macpeak & Seas

[57] ABSTRACT

An optical fiber coupling device is provided for use in situations where the fibers or fiber cables to be joined have diverse end terminations. Alignment and coupling is provided by a sleeve having a conical frustum surface at one entrance and a split cylindrical sleeve at the other entrance. The end terminations are urged toward each other by a threaded advancement member and a spring, respectively.

8 Claims, 3 Drawing Sheets

OPTICAL FIBER CONNECTOR

BACKGROUND OF THE INVENTION

This invention relates to a device for connecting the terminal ends of optical fiber cable, and more particularly to an optical fiber connector assembly which connects optical fiber connector plugs of different types secured on terminal ends of optical fiber cables.

Prior art connector assemblies connect the same type of optical connector plugs. In an optical connector disclosed in U.S. Pat. No. 4,422,716 (Morimoto et al), two uniform cylindrically configured optical fiber connector plugs are connected, which are secured on the ends of two optical fibers. A cylindrical sleeve with a slit or slits formed along its axis is placed in an adaptor and clamps the two optical connector plugs thereby preventing axial deviations.

Another optical connector is disclosed in U.S. Pat. No. 4,512,630 (Runge), wherein two optical connector plugs having conical frustum mating ends are connected in an adaptor having receiving surfaces at an intermediate portion which abuts against the frustum ends of both connector plugs when the connector plugs are inserted into the adaptor from opposite directions. The receiving surface has a predetermined angle with respect to the center axis of the adaptor which coincides with the inclination of the frustum ends of the connector plugs. The ends of the two connector plugs are placed to abut against the receiving surface to thereby align the center axes of the two connector plugs.

The aforementioned two types of optical fiber connectors differ from each other in respect of shape and method of connection, and are not compatible. It the heretofore caused inconveniences when optical communication devices using different connectors had to be connected.

SUMMARY OF THE INVENTION

An object of this invention is to provide an optical fiber connector, which connects different types of optical connector plugs.

Another object of this invention is to provide an optical fiber connector which is capable of connecting optical connector plugs of different diameters without causing axial deviation.

According to the present invention, there is provided an optical fiber connector assembly for connecting, in a socket, first and second optical connector plugs for terminating first and second optical fiber cables, comprising: a first connection plug including first connector body means having a frustum-shaped mating portion on a tip end thereof for securing a first optical fiber along the center axis thereof; a second connector plug including second connector body means having a cylindrical portion extending axially for a predetermined length for receiving a second optical fiber along the center axis thereof; a sleeve for aligning the first and second plugs, the sleeve including a frustum-shaped hollow receiving portion for receiving the first connector body means and for abuting against the frustum portion of the first connector body, and a cylindrical portion for receiving and clamping the second connector body means, the apex of the frustum of the receiving surface being positioned on the center axis of the cylindrical portion, socket means having a bore into which said sleeve is inserted, a means for pressing the first connector body means toward the tip end thereof, and means for urging the second connector body means so as to be forced toward a tip end thereof with the pressure smaller than the pressure exerted on the first connector body means.

BRIEF DESCRIPTION OF THE DRAWINGS

The present invention will be better understood from the following detailed description taken in conjunction with the accompanied drawings in which.

DETAILED DESCRIPTION OF THE PREFERRED EMBODIMENTS

Figure 1:
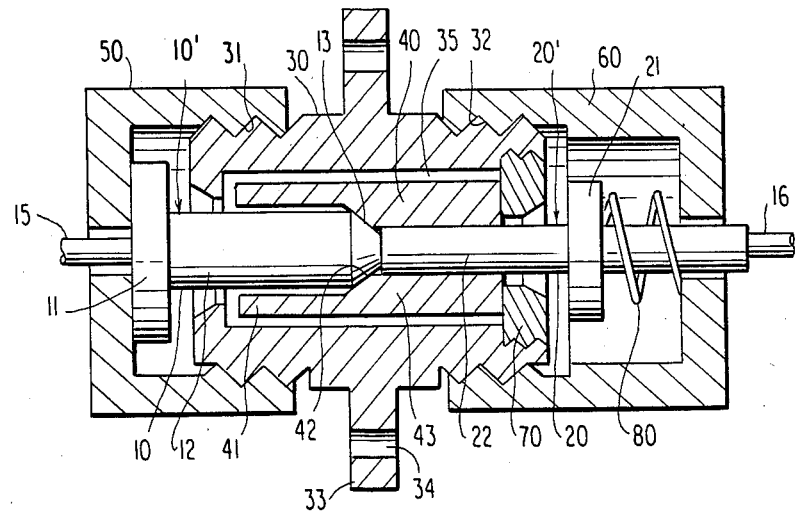
FIG. 1 is a sectional view of the first embodiment of the present invention.

FIG. 1 is a sectional view of the first embodiment according to this invention wherein a first optical connector plug 10' and a second optical connector plug 20' which terminate optical fiber cables 15 and 16, respectively, are connected in a sleeve 40 arranged in a socket or adaptor 30.

Figure 3:
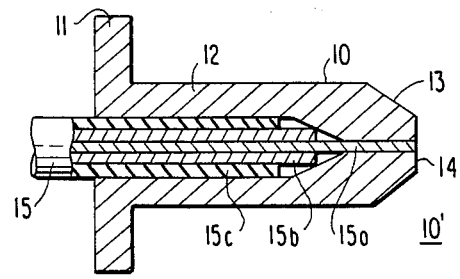
FIG. 3 is a sectional view of a first optical connector plug for use in the optical fiber connector shown in FIG. 1.

In FIG. 3, the optical connector plug 10' terminates the optical fiber cable 15 in a first cylindrical connector body 10 having a frustum-shaped mating portion 13 formed at the end. An optical fiber 15a of the cable 15 is clad with a tension member 15b and an outer sheath 15c. The optical fiber 15a is secured axially in the first, connector body 10 with the tip end thereof being extended through the small hole of the body and reaching the tip 14 while the tips of the tension member 15b and the outer sheath 15c do not reach the tip 14. The first connector body 10 has a flange 11 and a cylindrical portion 12 as well as the frustum-shaped mating portion 13. The diameter of the frustum portion 13 reduces toward the direction of the tip 14.

Turning back to FIG. 1, a second optical connector plug 20' terminates an optical fiber cable 16. The cable 16 is identical to the cable 15 in structure. The optical fiber in the cable 16 is secured axially in a connector body 20 with the tip end thereof extending to the tip of the connector body 20. The connector body 20 has a flange 21 and a cylindrical portion 22, and the diameter of the cylindrical portion 22 is smaller than that of the cylindrical portion 12 of the connector body 10 but larger than that of the tip 14.

The sleeve 40 includes a first cylindrical portion 41 into which the first connector plug 10' is inserted and which has a frustum-shaped hollowed receiving surface 42 receiving the frustum portion 13, and a second cylindrical portion 43 into which the second connector plug 20' is inserted. The receiving surface 42 is inclined with a predetermined angle toward the center axis of the sleeve 40, and the inclination coincides with the inclination of the frustum portion 13. The extension of the edge line of the receiving surface 42 or the apex intersects the center axis of the hollow portion of the second cylindrical portion 43. Therefore, when the connector plug 10′ is inserted in the sleeve 40 and tightened, the frustum portion 13 becomes pressed against the receiving surface 42, and the optical fiber secured in the connector body 10 becomes aligned with the center axis of the hollow portion inside the second cylindrical portion 43. The sleeve 40 has elasticity in the radial direction only in the second cylindrical portion 43 thereof so as to retain the connector plug 20′ in the cylindrical portion.

Figure 4:
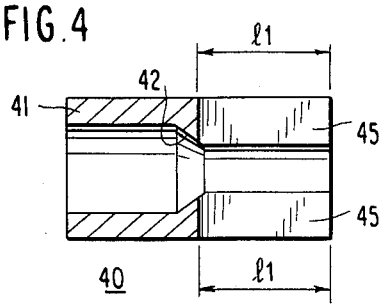
FIG. 4 is a sectional view of a sleeve used in the optical connector shown in FIG. 1.
Figure 5:
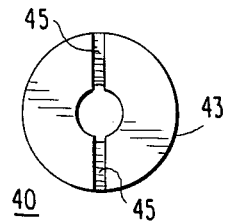
FIG. 5 is a right side view of the sleeve shown in FIG. 4.
Figure 6:
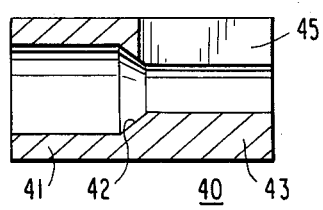
FIG. 6 is a sectional view of another embodiment of the sleeve used in the optical connector shown in FIG. 1.
Figure 7:
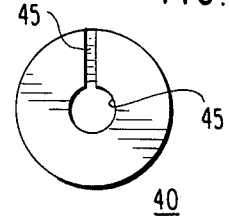
FIG. 7 is a right side view of the sleeve shown in FIG. 6.

In FIGS. 4 and 5, the second cylindrical portion 43 of the sleeve 40 is provided with plural slits 45 along the axis. The slits 45 have a length $l_1$ which is longer than the length of the second cylindrical portion 43, and partially extend into the surface 42. The sleeve 40 shown in FIGS. 6 and 7 is formed with one slit 45 on the side of the cylindrical portion 43 so as to provide the sleeve 40 with elasticity. The sleeve 40 may be made of metal or any other elastic material. If it is made of material other than metal, it should be provided with a means on the outer periphery of the sleeve for preventing the surface 42 from enlarging when the body 10 is inserted; e.g. a metal ring fit on the outer periphery of the sleeve 40.

On the socket or adaptor 30 are formed screw threads 31, 32 on the outer periphery thereof which are to be mated with a first coupling block 50 and a second coupling block 60 respectively, and has a flange 33 is formed at the center portion on the outer periphery thereof. The flange 33 has holes 34 which are used to connect the flange to the body of the device by means of screws. The socket 30 has a cylindrical hollow cavity 35 into which cylindrical sleeve 40 is inserted, and has a nut 70 fixed over one end of the hollow cavity 35. The nut 70 is provided for to prevent the sleeve 40 from coming out of the hollow cavity 35 of the socket.

The connector plug 20′ is constantly biased by a spring 80 in the direction of the connector plug 10′ so as to eliminate any gap between the two connector plugs 10′, 20′ when they are abutted. The spring 80 is placed between the external member 60 and the flange 21. The pressure applied to the connector plug 20′ by the spring 80 is smaller than the pressure applied to the receiving surface 42 by the frustum portion 13 of the connector plug 10′. This is because if the former pressure is larger than the latter, the connector plug 10′ becomes unstable in the sleeve 40 and impairs proper coupling.

Figure 2:
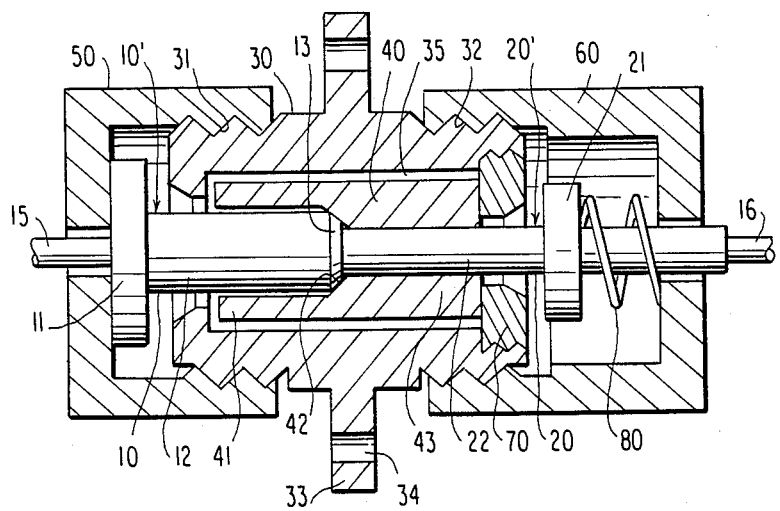
FIG. 2 is a sectional view of the second embodiment of the invention.

Although the tip diameter of the first connector body 10 shown in FIG. 1 is smaller than that of the second connector body 20, the relation between the two tips may be reversed as shown in FIG. 2. In this embodiment, a spring may be interposed between the coupling block 50 and the first connector body 10 so that the connector body 10 is pressed against the receiving surface 42 by the force of the spring.

Figure 8:
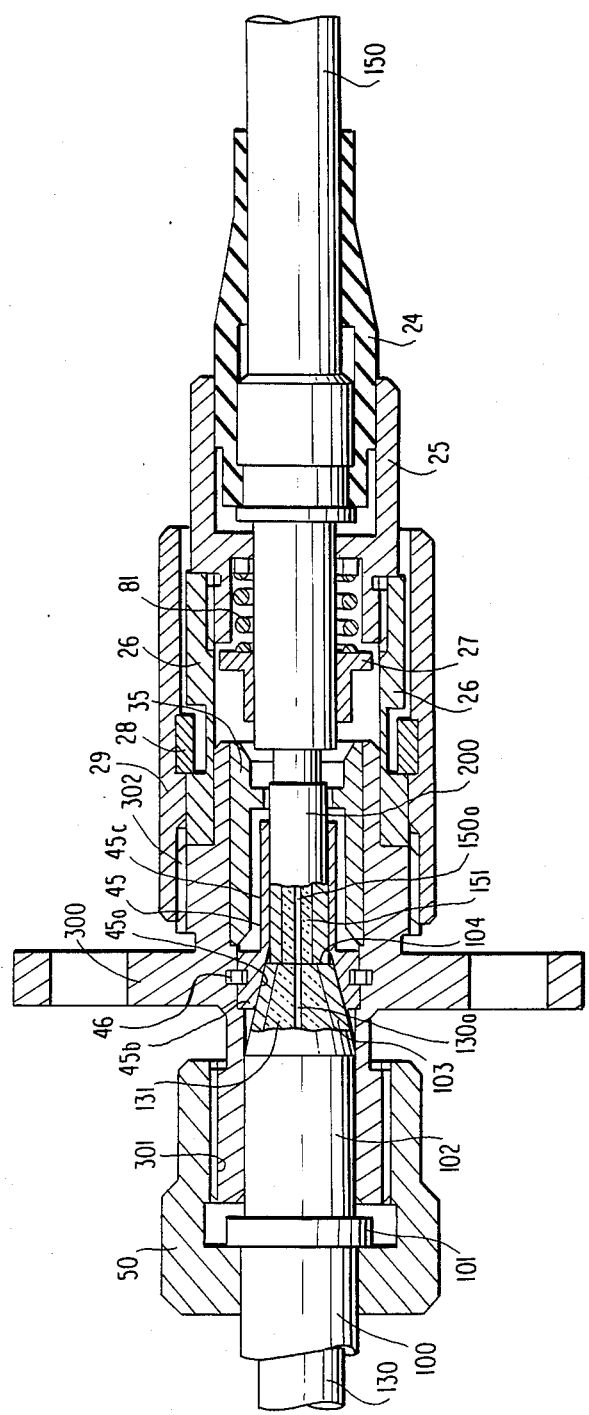
FIG. 8 is a sectional view of the third embodiment of this invention.

In the third embodiment shown in FIG. 8, the optical connector proposed by Morimoto et al is used.

A first cylindrical connector body 100 has a flange 101, cylindrical portion 102 and a frustum-shaped mating portion 103, and is secured on an end of an optical fiber cable 130. An optical fiber 130a within the optical fiber cable 130 is secured axially within the connector body 100 with its end reaching the tip 104 of the connector body 100. The tip of the optical fiber 130a is clad with glass 131 inside the connector body 100.

The second cylindrical connector body 200 which is to be connected with the connector body 100 is identical to the termination member disclosed by Morimoto et al. More particularly, the connector body 200 is secured on the terminal end of an optical fiber cable 150, and in turn secures an optical fiber 150a at the center axis thereof. The tip end of the optical fiber 150a is clad with glass 151 inside the body 200. To simplify the description, the tip end of the connector body 200 in the leftward direction is called the front end, and the opposite end thereof is called the rear end. In the figure, the rear end of a rubber sleeve member 24 is engaged with the cable 150 while the front end thereof is engaged with the connector body 200 at the rear end of the body 200. The rubber member 24 is secured at the rear portion of a housing 25 while the rear portion of the cylindrical member 26 is screwed onto the front end of the housing 25. Coil spring 81 is provided around the connector body 200 with one end held on the housing 25 and the other end held with a stopper 27. The stopper 27 is fixed on the connector body 200 so that the body 200 is pressed forward by the force of the spring 81. The cylindrical portion 26 is connected to one end of a socket 300. An external coupling block 29 is provided around the cylindrical member 26 via ring 28 in a freely rotatable manner, and its front end is engaged with the screw thread 302 on the outer periphery of the socket 300.

The socket 300 is fitted with the first connector body 100 from one end thereof and the second connector body 200 from the other end thereof. A cylindrical elastic sleeve 45 is secured on the inner wall of the socket 300 via a ring 46, and further a cylindrical member 35 is fixed thereon for narrowing the entrance of the socket 300 into which the connector body 200 is to be inserted. Screw threads 301, 302 are formed on the outer periphery of the socket 300 for engagement with the external coupling blocks 50, 29.

The sleeve 45 includes a first cylindrical portion 45b which has a receiving surface 45a inclined at an angle identical to the angle of the frustum portion 103, and a second cylindrical portion 45c into which the connector body 200 is inserted, and the diameter of the outer periphery of the cylindrical portion 45b is larger than that of the cylindrical portion 45c. Similarly to the surface 42 shown in FIG. 1, the receiving surface 45a has an edge line extending to intersect the cental axis of the cylindrical portion 45c. Therefore, when the coupling block 50 is pressed onto the flange 101, the frustum portion 103 becomes tightly pressed against the receiving surface of the sleeve 45, and the optical fiber 130a inside the connector body 100 is positioned on the central axis of the cylindrical portion 45c. In this case, there may be much clearance between the cylindrical portion 102 of the connector body 100 and the socket 300. However, there is no clearance between the connector body 200 and the sleeve 45, and the body 200 is held elastically within the sleeve 45. The sleeve 45 is formed with slits (not shown) at the location where the body 200 is inserted, in a manner similar to the sleeve 40 shown in FIGS. 4-7.

As is described in the foregoing, this invention can fully and effectively connect a first type of optical connector plug, which is connected by applying coupling pressure in the advancing direction and a second type of optical connector plug which is used by applying coupling pressure in the radial direction of the sleeve for coupling.

What is claimed is:

1. An optical fiber connector assembly for connecting, within a socket, first and second optical connector plugs terminating first and second optical fiber cables, comprising:

said first connector plug including first connector body means having a frustum-shaped mating portion at an end thereof, and securing a first optical fiber along the center axis thereof;

said second connector plug including second connector body means having an axially extending cylindrical portion and receiving a second optical fiber along the center axis thereof;

sleeve means for aligning said first and second plugs, and sleeve means including a frustum-shaped hollow receiving portion for receiving said first connector body means and for abutting against said frustum portion of said first connector body, and a cylindrical portion for receiving and clamping said second connector body means, the apex of the frustum of said receiving portion being positioned on the center axis of said cylindrical portion;

socket means having a bore into which said sleeve means is inserted;

first means for urging said first connector body means in a first direction; and second means for urging said second connector body means in an opposite direction with a pressure smaller than the pressure exerted on said first connector body means.

2. A connector assembly as claimed in claim 1, wherein said first and second urging means together urge ends of said first and second optical fibers into abutment.

3. A connector assembly as claimed in claim 2, wherein said first urging means includes a connector threaded onto said socket means and abutting a rear portion of said first connector body means.

4. A connector assembly as claimed in claim 3, wherein said second urging means includes at least a spring member having an end in engagement with a portion of said second connector body means.

5. A connector assembly as claimed in claim 1, further including means connected to said socket means for enclosing said sleeve means within said bore.

6. A connector assembly as claimed in claim 1, wherein said cylindrical portion of said sleeve means includes at least one slit formed therein to increase the radial flexibility of said sleeve means.

7. A connector assembly as claimed in claim 6, wherein said at least one slit extends parallel to the axis of said cylindrical portion and has a length greater than the length of said cylindrical portion such that said at least one slit extends partially into said frustum-shaped receiving portion.

8. An optical fiber connector assembly for connecting first and second diverse optical connector plugs, comprising:

a first connector plug including a frustum-shaped mating portion at an end thereof;

a second connector plug including an axially extending cylindrical portion;

sleeve means for aligning said first and second plugs, said sleeve means including within one entrance end a frustum-shaped receiving portion for receiving and abutting against said first connector plug, and a cylindrical portion for receiving said second connector plug, the apex of the frustum of said receiving portion being positioned on the central axis of said cylindrical portion; and means for urging said first and second connector plugs into abutment with one another within said sleeve means.

* * * * *

UNITED STATES PATENT AND TRADEMARK OFFICE
CERTIFICATE OF CORRECTION

PATENT NO. : 4,795,231

DATED : January 3, 1989

INVENTOR(S) : TANABE

It is certified that error appears in the above-identified patent and that said Letters Patent is hereby corrected as shown below:

COLUMN 4, LINE 47     Delete "cental" and insert --central--.

Signed and Sealed this

Tenth Day of October, 1989

Attest:

Attesting Officer

DONALD J. QUIGG

Commissioner of Patents and Trademarks